United States Patent
Wang et al.

(10) Patent No.: US 6,223,295 B1
(45) Date of Patent: Apr. 24, 2001

(54) MEANS FOR SAVING ELECTRICAL POWER

(75) Inventors: Gary Wang; Chieh Feng Wu, both of Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/116,581

(22) Filed: Jul. 16, 1998

(51) Int. Cl.$^7$ .................................................. G06F 1/26
(52) U.S. Cl. ............................................................ 713/320
(58) Field of Search .................................. 713/320, 321, 713/323, 324, 330, 340; 340/545.5

(56) References Cited

U.S. PATENT DOCUMENTS

| | | | |
|---|---|---|---|
| 3,087,145 | * | 4/1963 | Fruh ................................. 340/545.5 |
| 3,962,693 | * | 6/1976 | Schamblin ......................... 340/545.5 |
| 4,293,927 | * | 10/1981 | Hoshii ................................. 713/322 |
| 4,365,290 | * | 12/1982 | Nelms et al. ......................... 713/321 |
| 4,833,454 | * | 5/1989 | Pawlik et al. ......................... 340/545 |
| 5,402,105 | * | 3/1995 | Doyle et al. ....................... 340/545.5 |
| 5,666,541 | * | 9/1997 | Sellers ................................... 713/324 |
| 5,793,358 | * | 8/1998 | Petkovic et al. ....................... 345/168 |

FOREIGN PATENT DOCUMENTS

0171747A2  *  2/1986  (EP) .

* cited by examiner

Primary Examiner—Robert Beausoleil
Assistant Examiner—Xuong Chung-Trans
(74) Attorney, Agent, or Firm—Rosenberg, Klein & Lee

(57) ABSTRACT

Disclosed is a system for saving electrical power (II) comprising an external device, a control unit and a sensing device which is a directive switch and can sense the variation of angle. One end of the sensing device is connected to ground, another end of the sensing device is connected to the input of the control unit. The microcontroller will be switched to a power down mode from normal operation if the external device is not being accessed for a specific duration. Therefore, the PSEN pin of the microcontroller will be switched from a logical high state to a logical low state. At this time, the microcontroller will be triggered to recover the normal operation of external device if the sensing device senses angle change, thus reducing electrical power and prolonging the battery life.

8 Claims, 5 Drawing Sheets

MEANS FOR SAVING ELECTRICAL POWER

FIELD OF THE INVENTION

The present invention relates to a means for saving electrical power(II), more particularly, to a means with a directive device to control the microcontroller in a power down mode, thus reducing electrical power and prolonging the battery life.

BACKGROUND OF THE INVENTION

The electrical-power saving functions by microcontroller can be realized by following two ways. The first way is an idle mode, wherein the microcontroller is in an idle (without working) state while the devices connecting with the microcontroller (such as oscillators, counters, or serial interrupt unit) remain functioning. In this idle mode operation, the operating current for microcontroller is about 1 mA.

Another way for saving electrical-power is power down mode, wherein the oscillator and the microcontroller are both in off state. In this power-down mode, the operating current for microcontroller is below 10 uA.

The microcontroller is generally designed to switch from normal state to a power-saving state when the external devices connected to the microcontroller are idle for a specific period. At the power-saving state, the microcontroller is in an off state and can not function. The conventional device is designed to trigger the microcontroller to a workable state by a power switch. However, the operating current for the microcontroller triggered by the power switch is about 200~400 uA. The current consumption is excessively large.

SUMMARY OF THE INVENTION

The object of the present invention is to provide a means with a directive device to control the microcontroller in a power down mode, thus reducing electrical power and prolonging the battery life.

To achieve above function, the present invention provides a means for saving electrical power (II) comprising a directive switch arranged within a wireless remote controller of tumbler configuration (with rounded bottom), by which the direction switch is kept upright or inclined with a specific angle when the remote controller not being used and the direction switch is swung to send a triggering signal to the micro-controller if the remote controller being used.

The various objects and advantages of the present invention will be more readily understood from the following detailed description when read in conjunction with the appended drawing, in which:

NUMERAL 1. sensing device
   11 metal ring
   12 pendulum
2. microcontroller
3. external device
4. main body of remote controller
   41 circuit board
   42 base
   43 battery set

DETAILED DESCRIPTION OF THE PREFERRED EMBODIMENT

Figure 1:
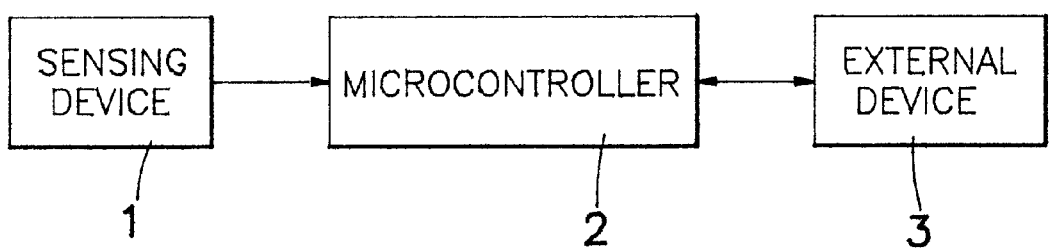
FIG. 1 shows the block diagram of the means according to a preferred embodiment of the present invention.
Figure 2A:
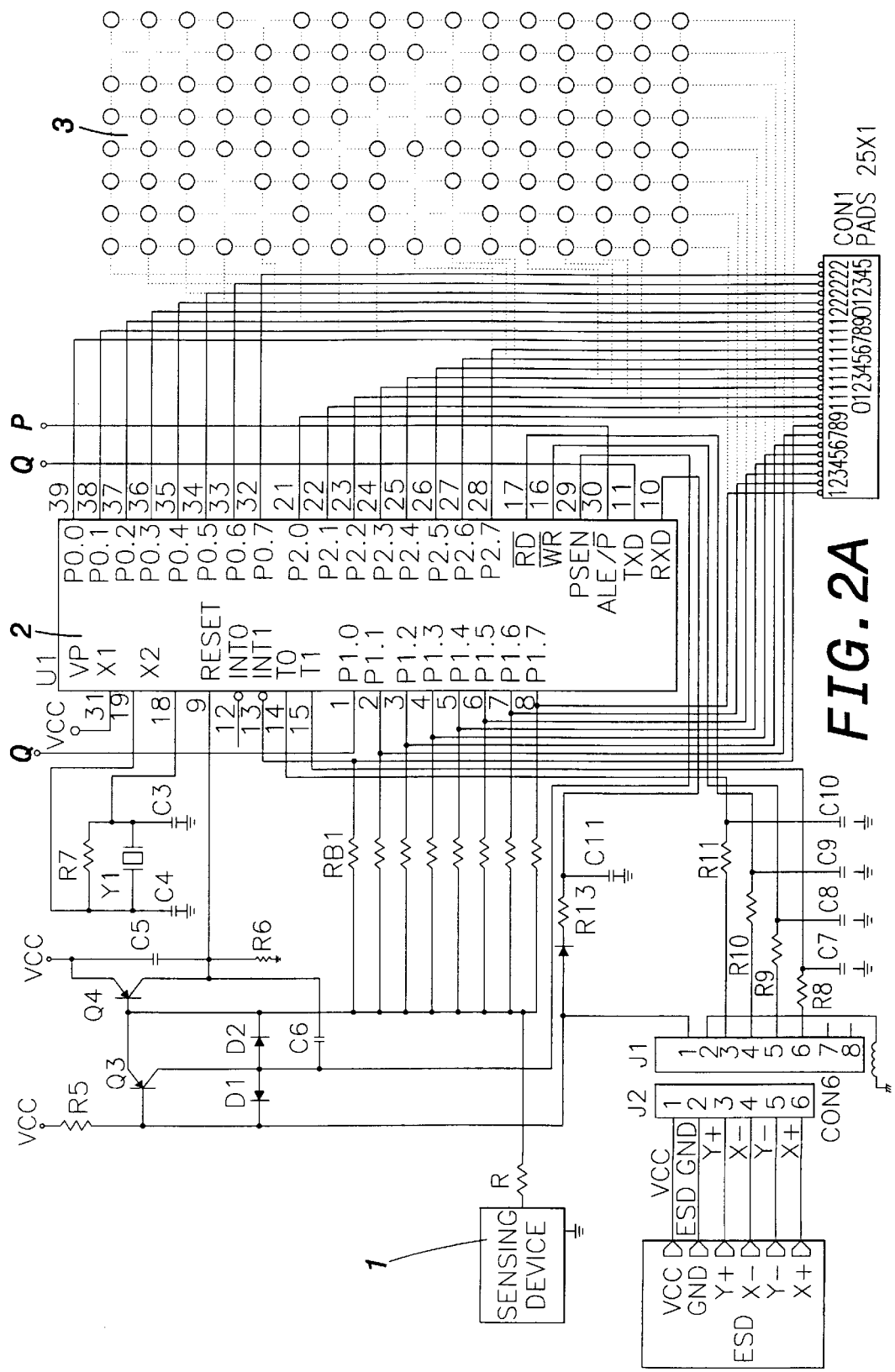
FIGS. 2A and 2B shows a circuit diagram for implementing the block diagram in FIG. 1.
Figure 2B:
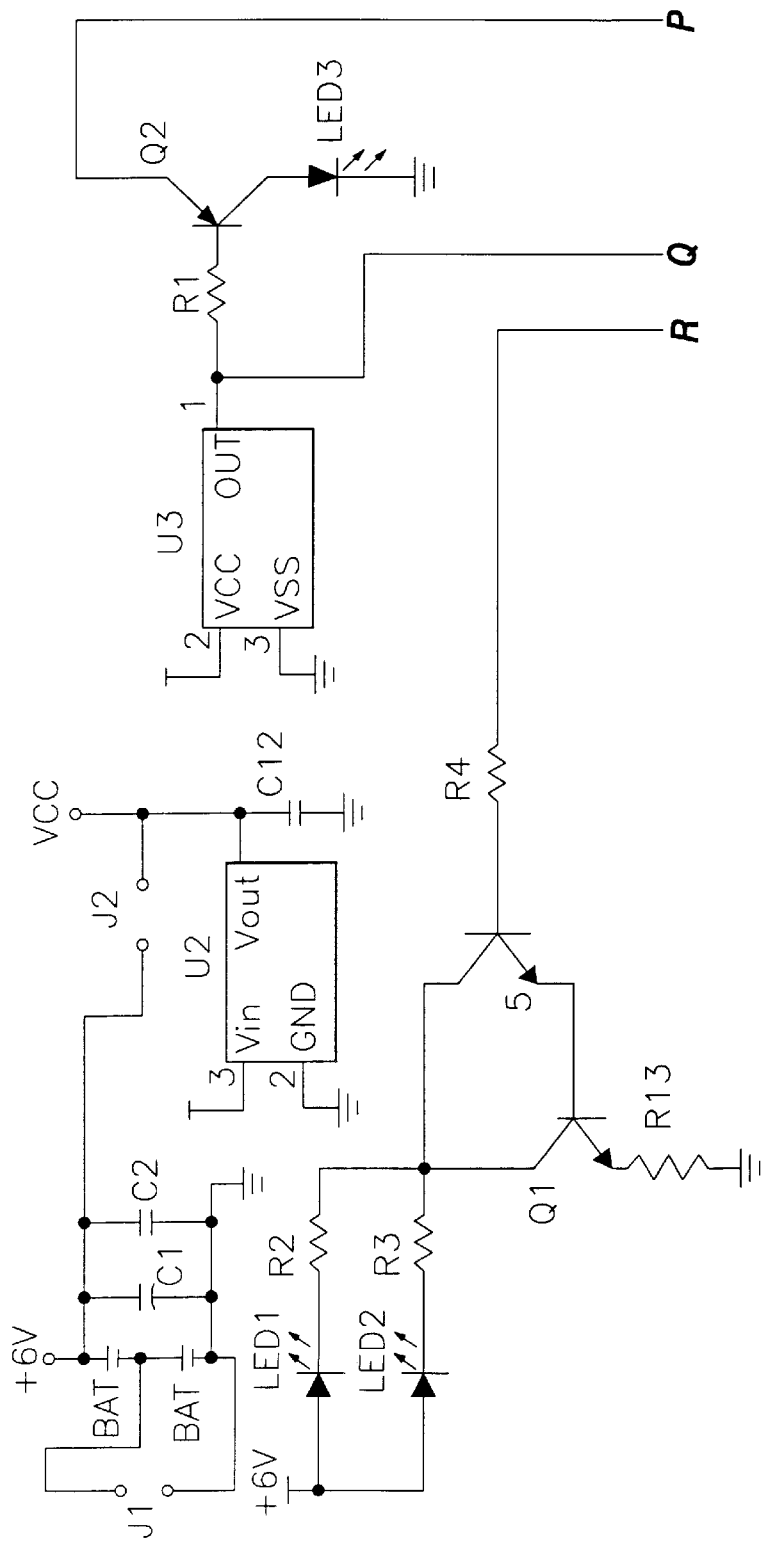

FIG. 1 shows the block diagram of the means according to a preferred embodiment of the present invention, and FIG. 2A and 2B shows a circuit diagram for implementing the block diagram in FIG. 1. As shown in FIG. 1, the means for saving electrical power (II) comprising a sensing device 1, a microcontroller 2 and an external device 3. The microcontroller 2 comprises an 8051 microprocessor U1, an oscillator Y1, resistors R5–R7, RB1, transistors Q3 and Q4, diodes D1 and D2, and capacitors C6, C7. The pins of PSEN (program-stored enable) and RESET of the microprocessor U1 are connected to the collector of transistor Q3 and Q4 respectively. The pins in output port of the microprocessor U1 (P0.0–P0.7, P1.0–P1.7, P2.0–P2.7) are connected to the external device 3. In the preferred embodiment, the external device 3 is a keyboard scanning matrix means. The pins P1.1–P1.7 are connected to the base of the transistor Q4 through resistor RB1. The emitter of transistor Q3 is connected to one end of the sensing device 1. The another end of the sensing device 1 is grounded. The sensing device 1 is a directive switch which can sense the variation of angle (about 25 degree).

The microcontroller 2 is designed to sense whether the external device 3 has been subjected to external force for every specific time (about 2 sec). The microcontroller 2 will be in a power down mode if the external device 3 is sensed to have no external force. At this time, the PSEN pin of the microprocessor U1 will be switched from a logical high state to a logical low state. The RESET pin is in a logical high state.

The microcontroller 2 will be switched from normal operation to a power down mode when the external device 3 is sensed to have no external force. The PSEN pin of the microcontroller 2 will be switched from a logical high state to a logical low state. At this time, the transistor Q4 is turned on if the angle of the sensing device 1 changes. The microcontroller 2 is triggered such that the RESET pin thereof is in a logical low state, and the external device 3 is recovered to normal state.

Figure 3:
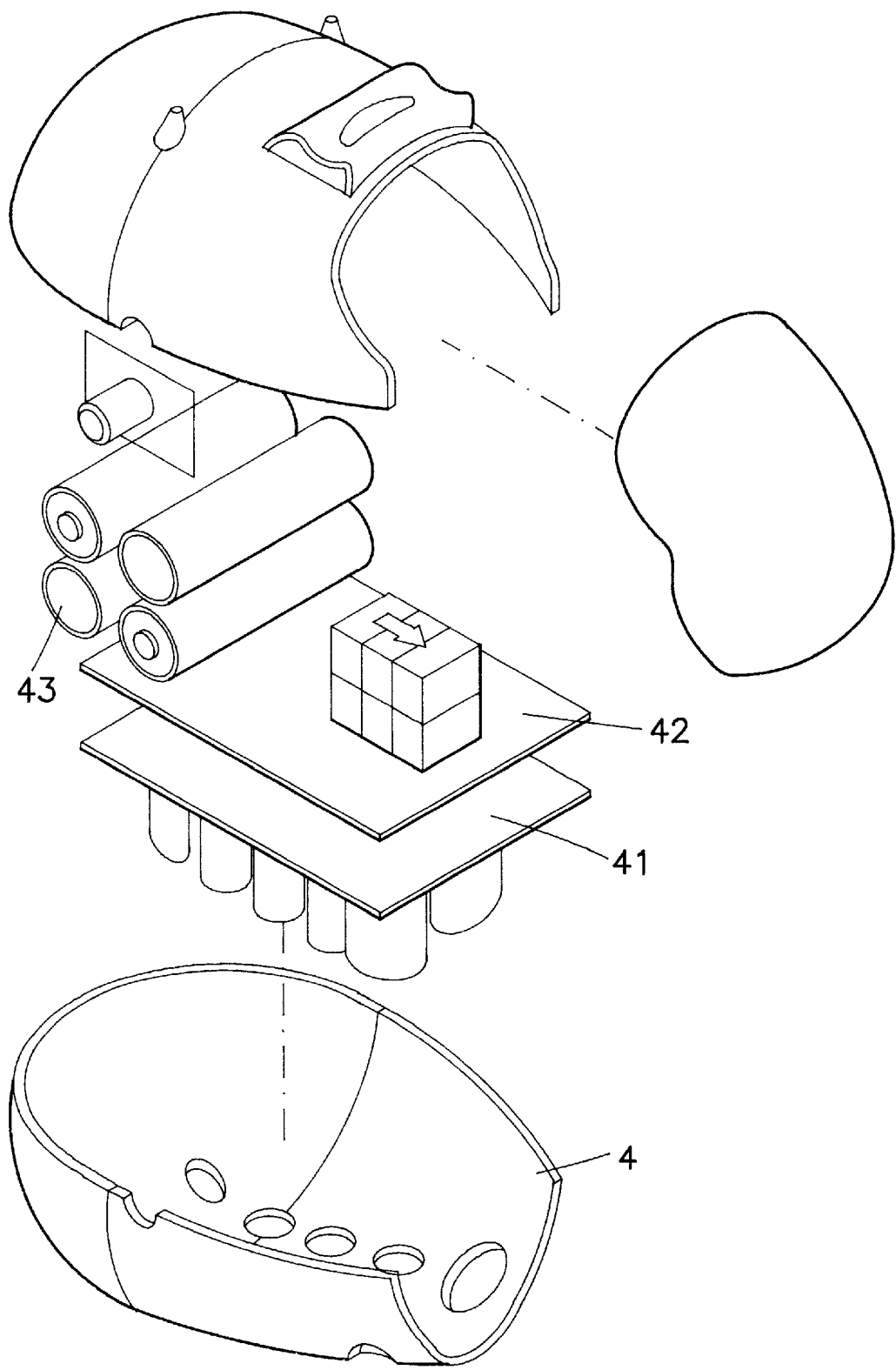
FIG. 3 shows the perspective view of sensing means according a preferred embodiment of the present invention.
Figure 4:
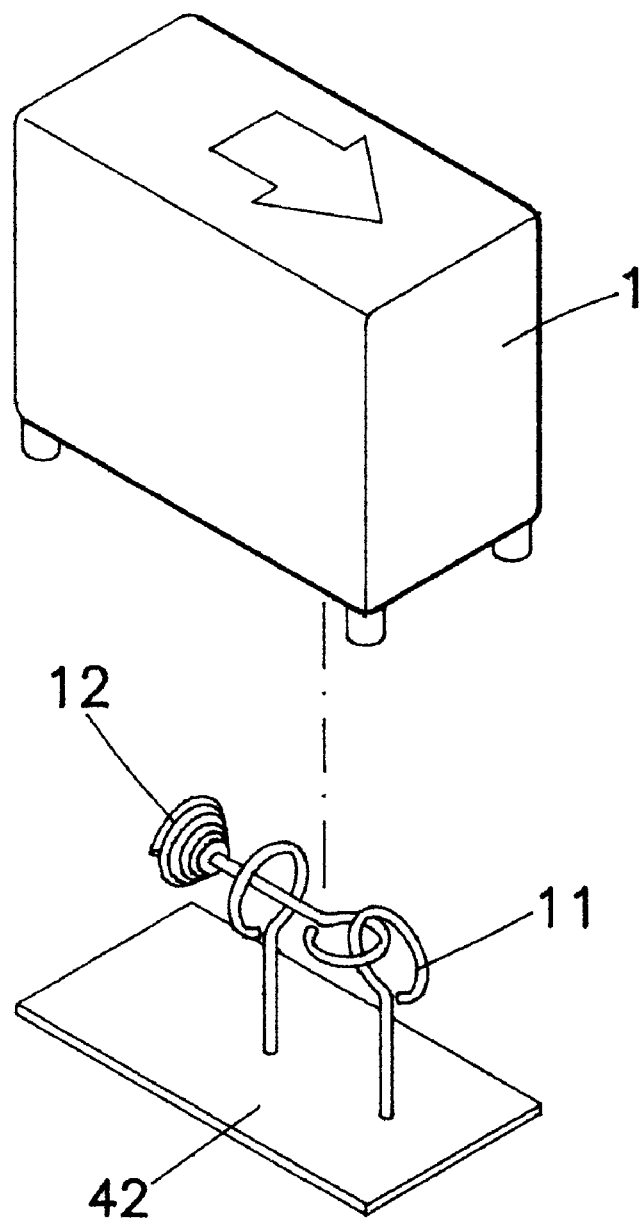
FIG. 4 is a schematic diagram of the sensing means in FIG. 3.

FIGS. 3 and 4 show the perspective view of sensing means according the preferred embodiment of the present invention The main body of the remote controller 4 is of a tumbler shape and houses a circuit board 41, a base 42 upon the circuit board 41, a sensing device 1 on the base 42. Both leads of the sensing device 1 are connected to the circuit on circuit board 41.

In this embodiment, the sensing device 1 is a gravity-type directive switch comprising a metal ring 11 and a pendulum 12. Moreover, a battery set 43 is arranged on one side of the base 42 to provide electric power and necessary weight for providing gravity force.

In other words, the battery set 43 is also functioned as center of gravity of the main body 4 to keep the main body upright or inclined with a specific angle. Moreover, if an external force is applied to the main body 4 (the remote controller is being used), the angle of the sensing device 1 changes (about 25 degree). At this time, the RESET pin of the microcontroller is triggered to recover the normal function of the external device 3.

Although the present invention has been described with reference to the preferred embodiment thereof, it will be understood that the invention is not limited to the details thereof Various substitutions and modifications have suggested in the foregoing description, and other will occur to those of ordinary skill in the art. For examples, the sensing device can be a mercury switch. Therefore, all such substitutions and modifications are intended to be embraced within the scope of the invention as defined in the appended claims.

What is claimed is:

1. A remote control with a system for saving electrical power, comprising:
   (a) a housing capable of maintaining a predetermined spatial orientation;
   (b) a keyboard mounted in said housing to be subject to an application of external forces;
   (c) a control unit disposed within said housing and operatively coupled to said keyboard, said control unit being switched to a power-down mode of operation responsive to said keyboard being devoid of said application of external forces for a predetermined time duration, said power-down mode of operation operatively disabling said keyboard;
   (d) a sensing unit mounted within said housing and operatively coupled to said control unit, said sensing unit being adapted to sense a change of said predetermined spatial orientation of said housing, whereby said control unit is returned to an operative mode responsive to said sensing unit sensing a deviation from said predetermined spatial orientation of said housing.

2. The remote control as in claim 1, wherein said control unit includes a micro-controller.

3. The remote control as in claim 1, wherein said sensing device includes a gravity-type switch.

4. The remote control as in claim 1, wherein said sensing device includes a mercury switch.

5. The remote control as in claim 1, wherein said sensing device comprises a metal ring and a pendulum.

6. The remote control as in claim 1, further comprising a battery power source disposed within said housing, said battery power source establishing a center of gravity of said remote control for maintaining said housing in said predetermined spatial orientation until displaced by a user.

7. The remote control as in claim 1, wherein said housing has a tumbler-shaped configuration.

8. The remote control as in claim 1, wherein said predetermined time duration approximates two seconds.

* * * * *